United States Patent [19]
Beliveau et al.

[11] 3,715,930
[45] Feb. 13, 1973

[54] VARIABLE DIAMETER CENTRIFUGALLY-OPERATED DRIVE PULLEY

[76] Inventors: Gilles Beliveau, 1225 Fremont St.; Jean-Marc Beliveau, 426 St. Joseph Blvd. West; Victor Beliveau, 8352 Place Mont Richard, Ville d'Anjou 434, all of St. Bruno de Montarville, Quebec, Canada

[22] Filed: May 27, 1971

[21] Appl. No.: 147,337

[52] U.S. Cl. .....................74/230.17 E, 74/230.17 F
[51] Int. Cl. .............................................F16h 11/06
[58] Field of Search ................74/230.17 E, 230.17 F

[56] References Cited

UNITED STATES PATENTS

| 3,478,611 | 11/1969 | Venne et al. | 74/230.17 E |
| 2,851,894 | 9/1958 | Seyfarth | 74/230.17 E |
| 2,288,114 | 6/1942 | Smith | 74/230.17 F |
| 2,909,071 | 10/1959 | Smyth et al. | 74/230.17 E |

*Primary Examiner*—C. J. Husar
*Attorney*—Pierre Lesperance

[57] ABSTRACT

A variable diameter pulley for use as a drive pulley in a V-belt drive assembly in which the axially movable pulley half is moved towards the fixed pulley half under action of centrifugal forces, said centrifugal forces being produced by a liquid filled annular flexible liquid-tight tube disposed in a chamber defined by the axially movable pulley half, a cylindrical wall depending from the periphery thereof and a disc secured to the drive shaft. Rotation of the liquid causes flattening of the tube with increase of rotational speed, thereby displacing the movable pulley half towards the fixed pulley half.

1 Claim, 3 Drawing Figures

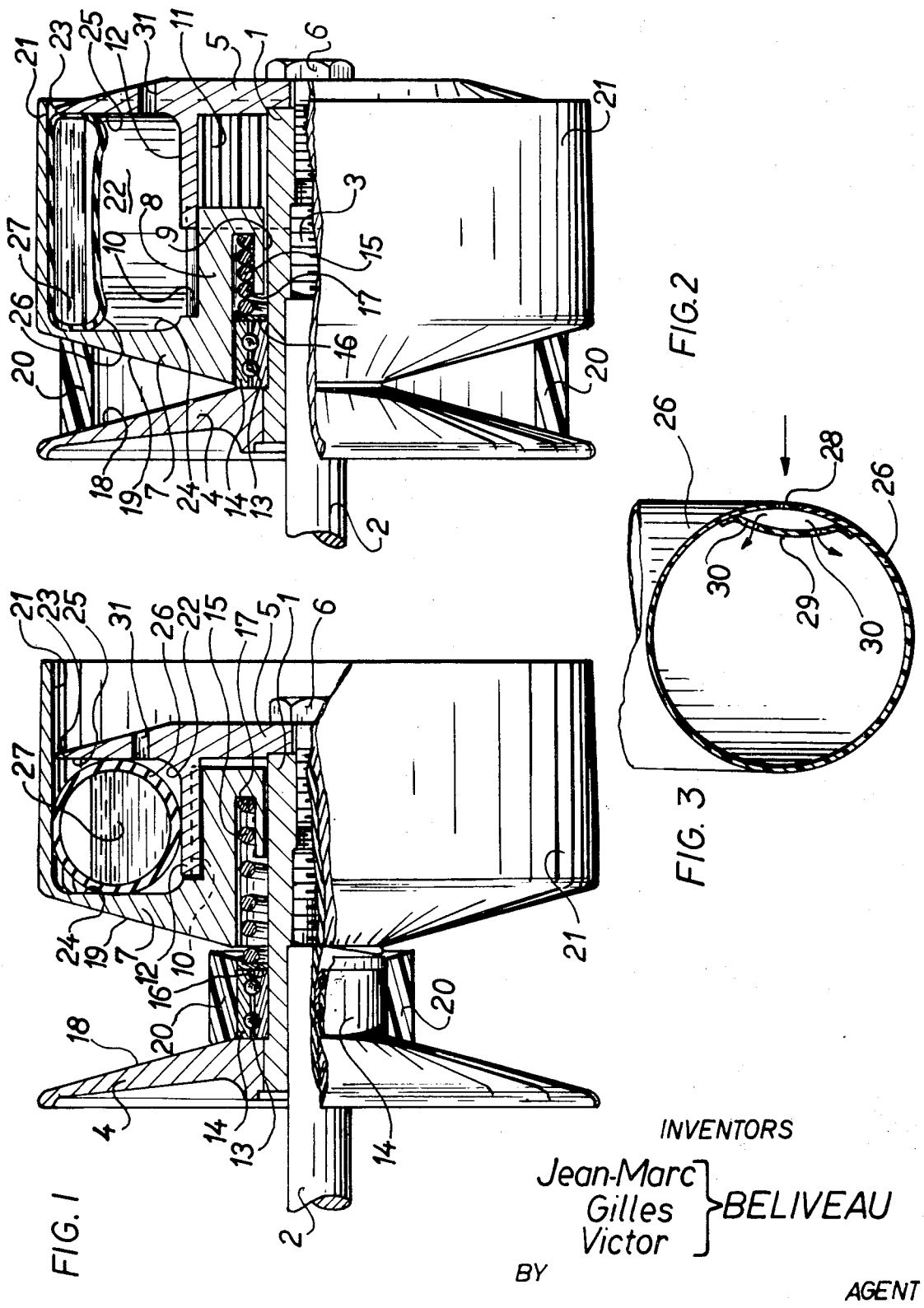

VARIABLE DIAMETER CENTRIFUGALLY-OPERATED DRIVE PULLEY

The present invention relates to a variable diameter pulley which is centrifugally operated and used as a drive pulley in a variable speed V-belt drive assembly, including a variable diameter driven pulley, the drive being operated by centrifugal force.

Drives of this type are extensively used in snowmobiles and other vehicles and also in industrial applications where a continuously variable speed drive is desired. Known variable diameter centrifugally-operated drive pulleys use pivoted levers, metal shots, guided blocks and the like as the means for moving the axially movable pulley half towards the fixed pulley half under centrifugal force. These solid centrifugal masses are the cause of serious accidents in the event of pulley breakage, as they fly off the pulley.

It has been proposed, see for instance U.S. Pat. Nos. 2,909,071 3,478,611, to replace the solid centrifugal masses by a liquid. In these latter Patents, the liquid is enclosed in a chamber composed of a rigid cylinder and rigid piston in telescopic engagement with the piston. O-rings or other suitable sealing means must be arranged between the cylinder and piston. However, these sealing means often fall down in practice, because the pulley is usually directly mounted on the drive shaft of an internal combustion engine, which causes vibration of the pulley. In U.S. Pat. No. 2,909,071, the liquid is enclosed in a flexible diaphragm attached at its peripheral edges to a disc member. It is difficult and complicated to effect an effective permanent seal between this flexible diaphragm and the rigid metal disc member and the stroke of the movable pulley half is limited.

It is the general object of the present invention to provide a variable diameter pulley using a liquid as centrifugal mass to axially move the movable pulley half towards the fixed pulley half with increase of speed of the rotation of the pulley, the centrifugal liquid being contained by novel means which overcome the above-noted defects of liquid containing pulleys.

Another object of the present invention is to provide a variable diameter pulley drive using a liquid as the centrifugal mass, so as to be very safe in operation and which produces very smooth and continuous variation of the speed ratio with the speed variation of the driving engine, which is very silent in operation, which is long-lasting and in which the speed of the engine at which clutching takes place can be easily varied, in accordance with the user's desire.

Another object of the present invention resides in the provision of a pulley of the character described, in which the axial force exerted on the movable pulley half is directed at the periphery of the pulley half against, or opposite, the V-belt and substantially equally uniformly around the pulley half periphery, so as to eliminate any torsion forces of the pulley half on the drive shaft, resulting in the elimination of any distortion of the pulley half and smooth slidable movement of the same on the drive shaft.

Another object of the invention resides in the provision of a drive pulley of the character described, in which the movable pulley shaft is mounted for free rotation on the drive shaft and is driven into rotation by interengageable splines formed on the movable pulley half and a disc secured to the drive shaft, and arranged radially of the drive shaft, thereby reducing and wear and damage to the splines due to shaft vibration.

In accordance with the invention, there is provided a variable diameter drive pulley comprising a drive shaft, a first pulley half and a disc spacedly secured to said drive shaft, a second pulley half axially movable on said drive shaft and disposed intermediate said first pulley shaft and disc, a cylindrical wall depending from the periphery of either the disc or the second pulley half and defining a variable volume chamber with said disc and second pulley half, and an annular flexible liquid containing endless tube disposed in said chamber. The liquid when subjected to centrifugal forces causes flattening of the tube against the cylindrical wall, the second pulley half and the disc, whereby the liquid and, consequently, the tube causes movement of the second pulley half away from said disc and towards the first pulley half with increase of rotational speed.

The foregoing and other objects of the present invention will become more apparent during the following disclosure and by referring to the drawings, in which:

FIG. 1 is an elevation partially in longitudinal section of the pulley in declutched position;

FIG. 2 is a similar view but showing the pulley at high speed drive; and

FIG. 3 is a cross-section of the flexible tube at the level of its filling valve.

In the drawings, like reference characters indicate like elements throughout.

The pulley of the invention comprises a drive shaft 1, rigidly detachably secured to the output shaft 2 of a driving motor, such as an internal combustion engine. For instance, the outer end portion 3 of the output shaft 2 is of reduced diameter and externally threaded, so that the output shaft is fitted within a corresponding inwardly threaded axial bore of the drive shaft to be screwed therein. A first pulley half 4 is rigidly secured as by welding to one end of drive shaft 2. A disc 5 is rigidly secured to the other end of drive shaft 1 by means of a bolt 6 screwed within the bore of drive shaft 1.

A second axially movable pulley half 7 is mounted on drive shaft 1, intermediate first pulley half 4 and disc 5. The second pulley half 7 has a hub formed by a sleeve 8 extending away from pulley half 4 and having its outer portion of increased thickness to provide a smooth inner cylindrical surface 9 having a sliding fit on shaft 1, so as to be rotatable and axially movable thereon. The outer cylindrical surface of sleeve 8 is provided with axially extending splines 10, which mesh with splines 11 formed at the inner cylindrical surface of sleeve 12 integral with disc 5 and telescopically engaging over sleeve 8. Thus, disc 5 serves to rotate pulley half 7 while allowing axial displacement of said pulley half.

A ball bearing 13 is fitted on shaft 1 against a shoulder of pulley half 4 with its outer race 14 free to rotate.

A compression coil spring 15 surrounds shaft 1, abuts at one end against a washer 16 which bears against the inner race of the ball bearing 13, while the other end portion of the spring 15 is inserted into an annular groove 17 made in sleeve 8 and the spring abuts against the bottom of the groove 17. The spring serves to urge the second pulley half 7 away from the first pulley half 4 to a position as shown in FIG. 1 wherein the outer end of sleeve 12 abuts the pulley half 7.

Pulley halves 4 and 7 have opposed tapered wall portions 18 and 19 respectively, defining pulley surfaces, for engaging therebetween a V-belt 20 for driving the latter.

Pulley half 7 has a cylindrical wall 21 extending towards disc 5 and around the same, so that the disc telescopically fits within the chamber 22 defined by pulley half 7, cylindrical wall 21 and sleeves 8 and 12. There is a slight clearance between the outer peripheral edge 23 of disc 5 and cylindrical wall 21.

The surface 24 of pulley flange 5 and inner surface 25 of disc 5, which face the chamber 22, are preferably flat and radial with respect to the axis of shaft 1.

Chamber 22 houses the means responsive to centrifugal force to move pulley half 7 towards pulley half 4 against the action of coil spring 15. These means consist of an annular flexible liquid-proof endless tube 26 containing a liquid 27. The tube 26 is preferably made of elastic material, such as rubber. The tube 26, when made of elastic material, tends to take a circular cross-sectional shape, as shown in FIG. 1, when the pulley is at rest, to substantially fill chamber 22 with pulley flange 7 abutting against sleeve 12 under action of the spring 15. The external diameter of the tube 26 is such as to frictionally engage the inner cylindrical surface of cylindrical wall 21.

An adjusted amount of liquid 27 is introduced within tube 26, the rest being air, which may be under pressure or not. The liquid can be oil, alcohol or water mixed with an antifreeze liquid, such as diethylene glycol and the like, when the pulley is to be used in cold weather. Otherwise, water only can be used.

The tube 26 forms a completely closed chamber for the liquid. To fill the tube with a liquid and also compressed air, if so desired, any type of valve means could be provided. For instance, a metal valve, such as found on air chambers for bicycles and the like, can be provided at the radially inner surface of the tube 26, or the tube may be lined at least over an area of its inner surface with a layer of a self-sealing latex and the tube filled with a hypodermic needle inserted through the tube in this area, whereby, upon removal of the needle, the latex will automatically seal the puncture. As an alternative, a valve, such as used on air inflated balls, can be used. Such a valve can be of the type shown in cross-section in FIG. 3, wherein the tube wall 26 has a hole 28 facing a membrane 29 of disc shape having its peripheral edge adhered and sealed to the inner surface of the tube wall at a radial distance outwardly from hole 28.

Disc membrane 29 has a plurality of through holes 30 spaced radially outwardly from tube hole 28. When the tube is being filled through hole 28, membrane 29 takes a position spaced from tube 26, as shown in FIG. 3, with the holes 30 establishing communication between the filling means and the interior of the tube 26.

When filling is completed, the internal pressure inside the tube presses the membrane 29 against the inner surface of tube 26, thereby sealing off holes 30.

With rotation of the drive shaft 1, the tube 26 which is in frictional contact with cylindrical wall 21, starts to rotate and also the liquid 27 therein. The liquid under centrifugal force exerts a radial pressure on cylindrical wall 21 and axial pressures on disc 5 and pulley half 7. The pulley half 7 is gradually axially moved towards pulley half 4 with progressive increase in the rotational speed. The axial movement of pulley half is substantially a linear function of the speed of rotation. Upon deceleration, coil spring 15 progressively moves pulley half 7 away from pulley half 4. During axial movement of pulley half 7, chamber 22 varies in size.

In order to prevent pressure variations within chamber 22 radially inwardly of the tube 26, through bores 31 are made in disc 5 to establish communication between chamber 22 and the atmosphere, the bores 31 being radially slightly outwardly spaced from sleeve 12.

In the stopped or low speed rotational condition of the pulley, the two pulley halves 4 and 7 are spaced apart and the V-belt 20 rests on the outer race 14 of ball bearing 13 and is therefore in declutched position. It is easy to adjust the amount of liquid in the tube 26 to thereby adjust the speed at which clutching of the belt takes place.

The liquid 27 being completely enclosed in tube 26, there is no need for sealing members between disc 5 and cylindrical wall 21. Actual tests have shown that the tube 26 does not get pinched in the clearance between wall 21 and peripheral edge 23 of disc 5 during axial movement of the cylindrical wall 21. There is a minimum of relative movement between the tube and the confining surfaces of the chamber 22, whereby the tube does not wear by friction.

Actual tests carried have shown a very smooth variation in the speed ratio of the variable transmission drive using the pulley of the invention, resulting in very smooth acceleration and also deceleration of a vehicle so equipped.

While a tube of normally circular cross-sectional shape has been shown, it is obvious that a tube of rectangular or square normal cross-section could be used. Also, two or more separate tubes could be used instead of one.

What we claim is:

1. A variable diameter driving pulley for a V-belt drive assembly comprising:
   a. a rotatable drive shaft;
   b. a first pulley half secured to said drive shaft and having a tapered wall portion defining one pulley surface;
   c. a disc secured to said drive shaft and spaced from said first pulley half;
   d. a second pulley half having a tapered wall portion defining the other pulley surface, said two pulley surfaces adapted to drivingly receive a V-belt therebetween, said second pulley half mounted on said drive shaft intermediate said first pulley half and said disc for axial and rotational movement relative to said drive shaft;
   e. said disc and second pulley half having opposed spaced surfaces;
   f. a cylindrical wall secured to the periphery of said second pulley half radially outwardly of said opposed spaced surfaces and telescopically engaged by said disc and defining a chamber with said disc and with said opposed spaced surfaces;

g. a compression coil spring surrounding said drive shaft and urging said second pulley half axially away from said first pulley half, said second pulley half having a sleeve-like hub portion surrounding said spring and having a radially outer cylindrical surface provided with longitudinally extending splines, said hub extending towards said disc and being disposed radially inwardly of said opposed spaced surfaces;

h. an inwardly splined cylindrical sleeve depending from said disc and extending towards said second pulley half and in telescopic engagement with the splines of said hub portion whereby said second pulley half is rotated by said drive shaft through said disc, said hub portion and said sleeve defining a radially inner wall for said chamber; and i. an annular flexible liquid-proof liquid-containing endless tube located in said chamber and engaging said opposed spaced surfaces and said cylindrical wall;

whereby the liquid in said tube produces flattening of said tube against said cylindrical wall under action of centrifugal forces, said tube engaging said surfaces of said second pulley half and of said disc to axially move said second pulley half towards said first pulley half with increasing speed of rotation of said drive shaft.

* * * * *